SENSING MECHANISM FOR STATISTICAL CARDS

Filed Dec. 1, 1953 2 Sheets-Sheet 1

Inventor
CHARLES THOMAS ARTHUR JONES
By [signature]

March 5, 1957 C. T. A. JONES 2,783,944

SENSING MECHANISM FOR STATISTICAL CARDS

Filed Dec. 1, 1953 2 Sheets-Sheet 2

Inventor
CHARLES THOMAS ARTHUR JONES
By [signature]

United States Patent Office 2,783,944

Patented Mar. 5, 1957

2,783,944

SENSING MECHANISM FOR STATISTICAL CARDS

Charles Thomas Arthur Jones, Wallington, England, assignor to Powers-Samas Accounting Machines Limited, London, England, a British company Application December 1, 1953, Serial No. 395,553

Claims priority, application Great Britain December 4, 1952

9 Claims. (Cl. 235—61.11)

Figure 1:
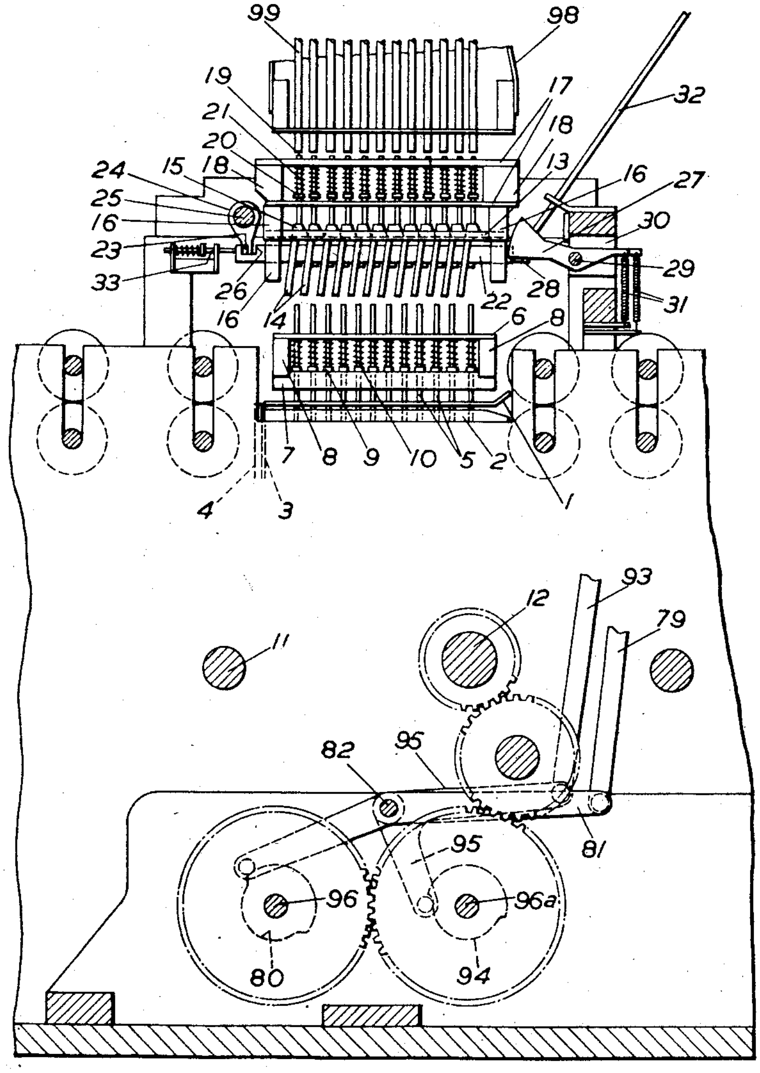

This invention relates to statistical machines and in particular to mechanism for sensing statistical record cards.

It is well known in the art to double the data-bearing capacity of a record card by utilising as a second set of data-indicating positions the spaces between the horizontal rows of normal data-indicating positions. Such data indications have come to be known as "normal" and "interstage" positions and will be referred to herein in these terms.

In United Kingdom specification No. 473,757 it has been proposed to provide means for sensing two fields of a record card successively, one field being sensed during one sensing operation and the other field being sensed during the next following sensing operation.

Further, in United States specification Patent No. 2,290,827 it has been proposed to sense cards punched in two fields both in normal and interstage positions and there is disclosed therein a sensing mechanism having associated therewith two card stops, one locating a card in position for normal sensing and the other for locating a card in position for interstage sensing. As described in this prior specification the card stops are operated alternately for each card fed to the sensing position so that each card is retained first in normal sensing position for two successive sensing operations and then in interstage sensing position for two successive sensing operations.

Heretofore, in machines in which two different fields of a card are sensed during successive sensing operations, the field selecting means has comprised a single element for each field so that it has not been possible readily to vary the fields or independently to control individual columns of sensing elements within a field and it is a main object of the present invention to provide field selecting means permitting the pre-setting of fields and the control of individual columns of transmission elements included in the sensing means.

According to the present invention a record card controlled statistical machine comprises sensing means including columns of transmission elements to transmit data sensed from a card and a reciprocable shutter for each column to co-operate therewith and control operation thereof, and field selecting means co-operating with said shutters to permit consecutive sensing of parallel groups of columns of the same record card during a cycle of sensing operations performed thereon and is characterised in that the field selecting means comprises a control element individual to each said shutter, an actuator connected to each control element to effect operation thereof to render its shutter active or inactive, a conditioning element for each actuator manually settable to condition the actuator for operation, and operating members common to all conditioning elements and operable during different sensing operations of a cycle thereof to cause conditioned actuators to render active the shutters controlled thereby.

Figures 2, 3:
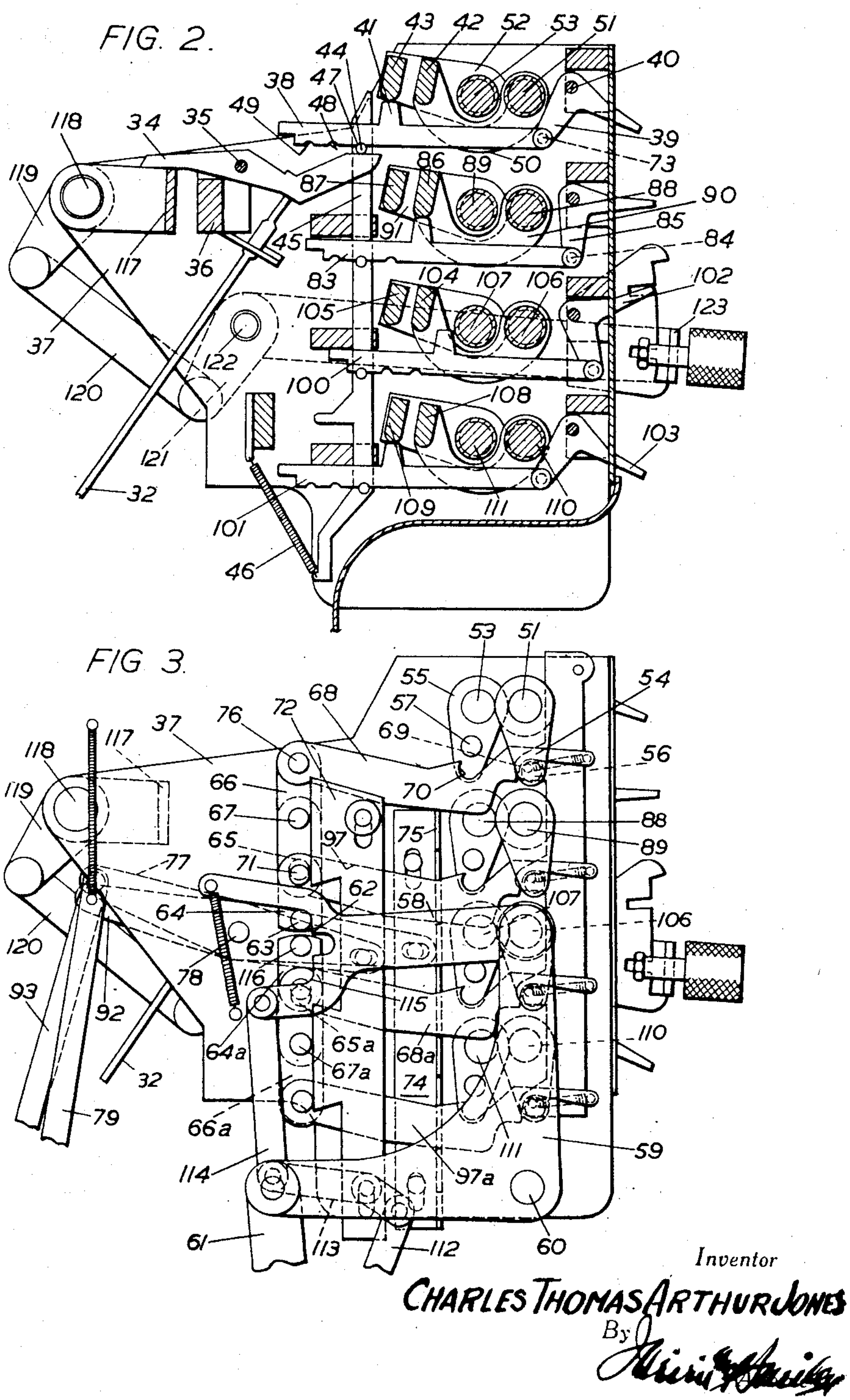

In order that the invention may be clearly understood one embodiment thereof will now be described, by way of example, with reference to the accompanying diagrammatic drawings in which:

Fig. 1 illustrates one column of a record card sensing device together with mechanism co-operating therewith and a control element to control the reciprocable shutter for the column, Fig. 2 is a section through a control unit and shows one column of the mechanism to control operation of a control element as shown in Fig. 1, and Fig. 3 is an end elevation of Fig. 2.

Referring to Fig. 1, a record card after passing through a pre-sensing device as described in United States specification Patent No. 2,638,270 is fed into a sensing chamber comprising an upper perforated plate 1 and a lower perforated plate 2, the card being located in this sensing chamber by one or other of a pair of card engaging elements shown diagrammatically as stops 3, 4. The card stop 3 is arranged to locate the card in a position such that normal data positions on the card can be sensed by sensing pins 5 of the sensing mechanism to be briefly described below. The card stop 4 is arranged to arrest a card in a position such that interstage data positions on the card can be sensed by the sensing pins 5.

The sensing mechanism diagramatically illustrated in Fig. 1 comprises a pin box constructed in a manner similar to that described in United Kingdom specification No. 401,012, and includes a lower reciprocable portion carrying the sensing pins 5 and an upper fixed portion. The lower reciprocable portion of the pin box comprises upper and lower pin plates 6, 7 connected at each end by a transverse bar 8, the plates 6, 7 being provided in the usual manner with holes for the reception of the sensing pins 5. Each sensing pin 5 has a collar 9 resting on the lower pin plate 7 and has a spring 10 tending to press the pin downwards. The movable portion of the pin box is reciprocated in known manner by mechanism not shown, the drive for the pin box being obtained from a shaft 11 driven from the main shaft 12 by mechanism not shown.

In the manner described in United Kingdom specification No. 401,012, the upper fixed part of a pin box includes a plate 13 having holes through which pass transmission elements 14 each having a head 15 by which the element is suspended from the plate 13. The plate 13 is supported by two transverse bars 16 which are fixed to the frame of the machine.

Also secured to the transverse bars 16 are two fixed pin plates 17 spaced apart by two further transverse bars 18, the pin plates 17 having holes through which pass transmission rods 19 (corresponding to the rods 18 shown in United Kingdom specification No. 401,012). Each transmission rod 19 has a collar 20 and a spring 21 which forces it downwards and the lower end of each rod 19 bears on the head 15 of the corresponding transmission element 14. As described in United Kingdom specification No. 401,012, each transmission rod 19 is offset with respect to the element 14 and the corresponding spring 21 tends to rock the transmission element 14 clockwise about its head 15.

Each column of transmission elements 14 has co-operating therewith a shutter 22, and a control bar 23 carried by an arm 24 is mounted on a shaft 25 to co-operate with slots 26 in the shutters 22 and is arranged selectively to operate the shutters 22.

In some instances, however, it is desired that only a predetermined section of the sensing mechanism be rendered effective during a sensing operation and to this end in the apparatus according to the present invention there are provided selectively operable devices which include control elements 27 having abutments 28 for co-operation with the ends of the shutters 22 opposite the ends thereof engaged by the control bar 23. A control element 27 and abutment 28 are provided for each shutter 22 and the elements 27 are freely pivoted on a fixed spindle 29, the spindle being common to all the elements 27 and supported in fixed brackets 30. Springs 31 are arranged to urge the control elements clockwise, as viewed in Fig. 1, about the spindle 29 so that the abutments engage the shutters 22 as illustrated in Fig. 1 and for each control element 27 there is a rod 32 operable from the control unit shown in Figs. 2 and 3 to move the control element 27 counterclockwise against the action of its spring 31, thereby to move the abutment 28 out of engagement with the shutter 22 to render the shutter active.

The slots 26 in the shutters 22 permit the movement of the shutters for one field while all other shutters are rendered inactive by being engaged by the abutments 28 on the control elements 27 co-operating therewith.

Spring-urged plungers 33 operate to cause the shutters 22 to follow the control bars 23 except when the shutters are rendered inactive by their control elements 27.

In the construction given herein by way of example, operation of the card stops 3, 4 is controlled by mechanism as described in the afore-mentioned specification No. 2,638,270 and certain operations of the control elements 27 are also controlled by this unit.

Referring to Figs. 2 and 3, each rod 32 is abutted at its upper end by an actuator 34 freely pivoted on a fixed spindle 35 supported by brackets 36 secured to fixed frame members 37. Disposed above the actuators 34 is a bank of conditioning elements 38, one conditioning element being provided for co-operation with each actuator 34. The conditioning elements are pivoted to bell-cranks 39 freely pivoted on a fixed spindle 40, the bell-crank 39 being rockable manually so that the conditioning element 38 can be moved lengthwise thereby to position an up-standing projection 41 thereon beneath one or other of two operating members 42, 43, each operating member comprising a bar which is common to all of the conditioning elements 38 of the bank thereof. Each conditioning element 38 is also movable by its bell-crank 39 to a neutral position at which it is not positioned for co-operation with either of the operating members 42, 43. Connection between a conditioning element 38 and the actuator 34 with which it is to co-operate is effected by a pin 44 carried by an up-right bar 45 supported for lengthwise sliding movement and urged to the upper position thereof, as shown in Fig. 2, by a spring 46. As can be seen from Fig. 2, the conditioning element 38 is provided with three grooves 47, 48, 49 to locate the conditioning element in one of the three positions thereof. As shown in Fig. 2 the conditioning element 38 is positioned so that groove 47 is engaged by pin 44 and the up-standing projection 41 is positioned for co-operation with operating member 43. Movement of the conditioning element 38 to the right, as viewed in Fig. 2, to position it so that groove 48 co-operates with pin 44 locates projection 41 for co-operation with operating member 42, while co-operation of groove 49 with pin 44 locates projection 41 in a position at which it will not be engaged by either of the operating members 42, 43.

The operating member 42 is supported by arms 50 secured to a first rocking shaft 51 supported by the frame members 37. The operating member 43 is supported by arms 52 secured to a second rocking shaft 53 also supported by the frame members 37. The rocking shafts 51, 52 have secured thereto levers 54, 55, Fig. 3, the lever 54 supporting a pin 56 and the lever 55 supporting a pin 57. Rocking of levers 54 and 55 is effected by linkage which includes a link 58 connected to a machine operated member 59 comprising a bell-crank lever pivoted at 60 to a frame member 37 and rockable about the pivot 60 by a link 61 which is pulled downwards during every sensing operation by a cam, not shown, secured to the main shaft 12. The link 58 is provided with a shoulder 62 for engagement with a pin 63 carried by a lever 64 pivoted at 65 to the frame member 37. A further lever 66 is pivoted at 67 to the lever 64 and to the upper end of lever 66 is pivoted a link 68 having a shoulder 69 for co-operation with pin 56 and a shoulder 70 for co-operation with pin 57.

As shown in Fig. 3 the shoulder 69 is engaging pin 56 so that on counterclockwise movement of the machine operated member 59, the link 58 is moved to the left, as viewed in Fig. 3, thus rocking lever 64 clockwise about its pivot 65. At this time a pin 71 carried by lever 66 is engaged by a vertically slidable member 72, hereinafter referred to as a second interponent, and accordingly the lever 66 is moved clockwise about its pivot 67 thus moving link 68 to the right as viewed in Fig. 3, thereby causing lever 54 to be moved counterclockwise and rocking the first operating member 42 downwards so that it will engage and depress any conditioning elements 38 whose projections 41 are aligned therewith. On depression by the operating member the conditioning elements 38 rock about their pivots 73, thereby rocking the actuators 34 with which they co-operate clockwise about spindle 35 and moving the rods 32 abutted thereby downwards so that the control elements 27 engaged by the rods move their abutments 28 out of engagement with the shutters 22 co-operating therewith, thus rendering the shutters active.

During the second sensing operation of a cycle of sensing operations a first interponent 74 is moved upwards so that an abutment 75 carried thereby engages the underside of the link 68 thereby turning the link 68 counterclockwise about the pivots 76 therefore and moving the shoulder 69 out of engagement with pin 56 and the shoulder 70 into engagement with pin 57. Thus when the machine operated member 59 is rocked during the second sensing operation, it is the lever 55 which is rocked by link 68 instead of lever 54 and, accordingly, the second operating member 43 is rocked downwards to depress conditioning elements 38 the projections 41 of which have been aligned therewith.

The first interponent 74 is operated by an arm 77 pivoted at 78 and connected to a link 79 which is controlled by a cam 80, Fig. 1, connection between link 79 and cam 80 being made by a bell-crank lever 81 pivoted at 82. The link 79 is operated at every alternate sensing operation after the first sensing operation and it will therefore be understood that when only normal data positions are being sensed during a cycle of two sensing operations the lever 54 will be rocked during the first sensing operation and the lever 55 will be rocked during the second sensing operation.

From Fig. 2 it will be seen that a second bank of conditioning elements 83 is disposed below the first bank of elements 38, the elements 83 being pivoted at 84 to bell-crank levers 85 by which they can be manually set to one of three positions as described above with reference to the conditioning elements 38. For co-operation with conditioning elements 83 there is provided a third operating member 86 and a fourth operating member 87, these two members being respectively actuated by a third rocking shaft 88 and a fourth rocking shaft 89, the members 86, 87 being connected with their shafts 88, 89 by arms 90, 91 respectively.

The second bank of conditioning members 83 is connected with the bank of actuators 34 by the bar 45 which, accordingly acts as a connecting element to connect the conditioning elements 83 of the second bank with the actuators 34. The conditioning elements 83 and the operating members 86, 87 co-operating therewith are provided to control field selection during interstage sensing operations performed in the manner described in the afore-mentioned specification No. 2,638,270 and when the operating members 86, 87 are operable, the first and second operating members 42 and 43 are rendered inactive.

The operating members 42, 43 are rendered inactive by the second interponent 72 which, between the second and third sensing operations of a cycle of four sensing operations, is moved upwards by a lever 92 also pivoted at 78 and connected with a link 93 controlled by a cam 94, Fig. 1, connection between the cam 94 and link 93 being effected by a bell-crank lever 95 also pivoted at 82. The cams 80 and 94 are secured to spindles 96 and 96a which respectively correspond to the control shafts 76 and 77 described in specification No. 2,638,270. Thus, when during the third and fourth sensing operations the machine operated member 59 is rocked about its pivot 60 by link 61, the second interponent 72 having been raised from the position shown in Fig. 3, to disengage pin 71 and to engage the pivot pin 76, on clockwise movement of lever 64, the lever 66 will be moved counter-clockwise thereby effecting movement of a link 97 to the right, as viewed in Fig. 3, and, according to the position of the first interponent 74 effecting rocking of rocking shaft 88 and 89.

Referring to Fig. 1 there is illustrated therein a connection box 98 containing transmission wires 99 operable under control of the transmission elements 14 to control the stops for the printing head of a tabulating machine. The box 98 illustrated in Fig. 1 includes only one set of transmission wires which, for the purposes of illustration, may be considered to be what is known in the art as "straight wires" and the mechanism described above is capable of fully controlling the operation of a connection box containing one set only of transmission wires during a sensing cycle of two, three or four sensing operations.

If desired, however there may be employed a duplex connection box which incorporates two different sets of transmission wires, such a connection box forming no part of the present invention, and for the purpose of accommodating a duplex connection box there is provided a third bank of conditioning elements 100 disposed below the second bank of conditioning elements 83 and there is also provided a fourth bank of conditioning elements 101 disposed beneath the third bank of elements 100. It will be understood that when two different kinds of wiring are employed in a single connection box, that is in a duplex connection box, field selection for the two types of transmission wires will be different and the third and fourth banks of conditioning elements 100 and 101 respectively are manually settable by bell-crank levers 102, 103.

To co-operate with the third bank of conditioning elements 100 there is a fifth operating member 104 and a sixth operating member 105 secured respectively to a fifth rocking shaft 106 and a sixth rocking shaft 107, and for co-operation with the fourth bank of conditioning elements 101 there is provided a seventh operating member 108 and an eighth operating member 109 secured respectively to a seventh rocking shaft 110 and an eighth rocking shaft 111. From the drawings it will be observed that the manner of operating the rocking shafts 106, 107, 110, 111 is by a linkage similar to that described above, but prior to the first sensing operation of a cycle the sensing of a control hole in a card being sensed at the pre-sensing position will cause operation of a link 112, Fig. 3, connected to a bell crank 113 which is connected with the link 58 by a third interponent or selector member 114 so that, on downward movement of link 112, interponent 114 is raised thereby moving the link 58 clockwise so that the shoulder 62 is disengaged from pin 63 and a further shoulder 115 is engaged with a pin 116 on a lever 64a pivoted at 65a, the lever 64a having a further lever 66a pivoted thereto at 67a. From the drawings it will be understood that when shoulder 115 engages pin 116, operation of the machine operated members 59, 79, and 93 will effect operation of the links 68a and 97a in a manner similar to that described above with reference to links 68 and 97.

It will be understood that it will not always be required that the sensing device senses cards during cycles of successive sensing operations, but that it may be required to condition the sensing apparatus so that during successive sensing operations the whole of a card is sensed during each sensing operation. To permit the sensing apparatus to be so conditioned, means is provided to render the shutters 22 permanently active and such means comprises a bail 117, Fig. 2, secured to a shaft 118 to which is also secured an arm 119. The arm 119 is connected by a link 120 to a lever 121 secured to a rocking spindle 122, the spindle 122 also having secured thereto a manually operable lever 123. On manual movement of the lever 123 in a counter-clockwise direction, as viewed in Fig. 2, the bail 117 is also moved in a counter-clockwise direction, thereby moving all of the actuators 34 in a clockwise direction to a position at which, through the rods 32, all of the control elements 27 are moved counter-clockwise to render all of the shutters 22 active. The lever 123 is latched in the adjusted position thereof and the shutters 22 accordingly remain active until the lever 123 is moved in a clockwise direction to restore the control elements 27 to the positions thereof as indicated in Fig. 1.

I claim:

1. A record card controlled statistical machine comprising sensing means including columns of transmission elements to transmit data sensed from a card and a reciprocable shutter for each column to co-operate therewith and control operation thereof, a control element individual to each said shutter, a bank of pivoted actuators of which each actuator is connected to a control element appropriated thereto to effect operation thereof to render its shutter active or inactive, a bank of conditioning elements including one conditioning element for each actuator manually settable to condition its actuator for operation, said conditioning elements being disposed above the actuators and pivotally supported to effect pivotal movement of the actuators, a first operating member disposed above the conditioning elements to co-operate with a first group of manually selected ones thereof to effect said pivotal movement of actuators co-operating therewith, a second operating member disposed above the conditioning elements to co-operate with a second group of manually selected ones thereof, a first rocking shaft supporting said first operating member, a second rocking shaft supporting said second operating member, linkage to effect rocking of said shafts, a first machine operated member to effect operation of said linkage during each sensing operation of a cycle of sensing operations and arranged normally to cause rocking of said first shaft, a movable interponent to co-operate with said linkage thereby to vary the action thereof to cause rocking of the second shaft, and a second machine operated member co-operating with said interponent during alternate sensing operations to cause said interponent to effect said variations of action of said linkage.

2. A machine according to claim 1, including a second bank of conditioning elements disposed below said first bank, connecting elements connecting the conditioning elements of the second bank with said actuators, a third operating member disposed above the elements of the second bank to co-operate with a group of manually selected ones thereof and thereby effect operation of a third group of the elements of the first bank, a fourth operating member disposed above the elements of the second bank to co-operate with a further group of manually selected ones thereof and thereby effect operation of a fourth group of elements of the first bank, third shaft supporting said third operating member, a fourth shaft supporting said fourth operating member, a second movable interponent to co-operate with said linkage to vary the action thereof thereby to cause rocking of said third shaft during the third sensing operation of a cycle and in co-operation with said first-interponent to cause rocking of said fourth shaft during the fourth sensing operation of a cycle.

3. A machine according to claim 2, including a third bank of conditioning elements disposed below said second bank, a fourth bank of conditioning elements disposed below said third bank, connecting elements connecting the conditioning elements of the third and fourth banks with said actuators, a fifth operating member disposed above the elements of the third bank to co-operate with a group of manually selected ones thereof and thereby effect operation of a group of elements of said first bank, a sixth operating member disposed above the elements of the third bank to co-operate with a group of manually selected ones thereof and thereby effect operation of a further group of elements of the first bank, a seventh operating member disposed above the elements of the fourth bank to co-operate with a group of manually selected ones thereof and thereby effect operation of a still further group of elements of the first bank, an eighth operating member disposed above the elements of the fourth bank to co-operate with a group of manually selected ones thereof and thereby effect operation of yet another group of elements of the first bank, a fifth rocking shaft supporting said fifth operating member, a sixth rocking shaft supporting said sixth operating member, a seventh rocking shaft supporting said seventh operating member, an eighth rocking shaft supporting said eighth operating member, a second linkage to effect rocking of said fifth, sixth, seventh and eighth rocking shafts under control of said first and second interponents and said first, second and third machine operated members, a third movable interponent connected with said first linkage, and a fourth machine operated member co-operating with said third interponent to render said second linkage effective and said first linkage ineffective.

4. A machine according to claim 1, including a rocking bail extending beneath said bank of actuators and manually operable linkage to effect rocking of the bail thereby simultaneously to render all said shutters active.

5. A machine according to claim 2, including a rocking bail extending beneath said bank of actuators and manually operable linkage to effect rocking of the bail thereby simultaneously to render all said shutters active.

6. A machine according to claim 3, including a rocking bail extending beneath said bank of actuators and manually operable linkage to effect rocking of the bail thereby simultaneously to render all said shutters active.

7. A record card controlled statistical machine, comprising sensing means including columns of transmission elements to transmit data sensed from a card and a reciprocable shutter for each column to co-operate therewith and control operation thereof, a control element individual to each said shutter, a bank of pivoted actuators of which each actuator is connected to a control element appropriated thereto to effect operation thereof to render its shutter active or inactive, a plurality of superimposed banks of manually settable conditioning elements of which each bank includes for each actuator one conditioning element settable to control operation of the actuator appropriated thereto, operating members for each said bank of conditioning elements, said operating members for each bank being operable independently one of the other to effect actuation of conditioning elements set for actuation thereby, a machine operated element common to all said operating members to effect operation thereof, interponents interposed between the operating members and the machine operated elements and operable cyclically to condition one operating member only for operation by said machine operated element during each cycle of the sensing means, and a card operated selector member co-operating with said machine operated element and operable selectively to couple the machine operated element to the operating members for predetermined banks of conditioning elements to permit said cyclic operation only of the operating members associated with said banks.

8. A record card controlled statistical machine, comprising sensing means including columns of transmission elements to transmit data sensed from a card and a reciprocable shutter for each column to co-operate therewith and control operation thereof, a control element individual to each said shutter, a bank of pivoted actuators of which each actuator is connected to a control element appropriated thereto to effect operation thereof to render its shutter active or inactive, a plurality of superimposed banks of manually settable conditioning elements of which each bank includes for each actuator one conditioning element settable to control operation of the actuator appropriated thereto, a connecting bar for each said actuator said bar being supported for sliding movement, spring-urged to the inactive position thereof and coupling its actuator with the conditioning elements appropriated thereto, a pair of independently operable operating members for each bank of conditioning members to effect movement thereof to cause operation of the actuators, a machine operated element common to all said operating members to effect operation thereof, interponents interposed between the operating members and the machine operated element and operable cyclically to condition one operating member only for operation by said machine operated element during each cycle of the sensing means, and a card operated selector member co-operating with said machine operated element and operable selectively to couple the machine operated element to the operating members for predetermined banks of conditioning elements to permit said cyclic operation only of the operating members associated with said banks.

9. A machine according to claim 8, including a rocking bail extending beneath said bank of actuators and manually operable linkage to effect rocking of the bail thereby simultaneously to render all said shutters active.

References Cited in the file of this patent

UNITED STATES PATENTS 2,496,138 Thomas et al. ---------- Jan. 31, 1950